INVENTOR.
MARCELLUS S. MERRILL
LOWELL H. ERICKSON
BY
ATTORNEY

June 8, 1965 M. S. MERRILL ETAL 3,187,440
DYNAMIC WHEEL ALIGNMENT TESTING APPARATUS
Filed Aug. 18, 1961 7 Sheets-Sheet 4

INVENTOR.
MARCELLUS S. MERRILL
LOWELL H. ERICKSON
BY
Philip H. Sheridan
ATTORNEY

United States Patent Office 3,187,440
Patented June 8, 1965

3,187,440
DYNAMIC WHEEL ALIGNMENT TESTING APPARATUS
Marcellus S. Merrill, 335 Colorado Blvd., Denver, Colo., and Lowell H. Erickson, Denver, Colo.; said Erickson assignor to said Merrill
Filed Aug. 18, 1961, Ser. No. 132,426
25 Claims. (Cl. 33—203.13)

This invention relates to a new and useful method and means for quickly and accurately checking and measuring vehicle wheel alignment; and more particularly relates to an alignment checking apparatus for determining camber, caster, toe-in and kingpin inclination of a wheel or wheels in motion.

Figure 4:
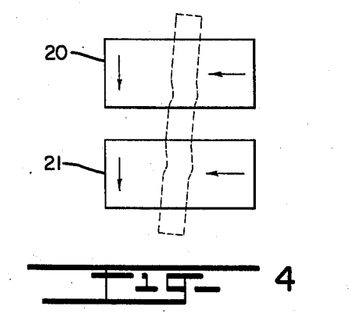
FIGURE 4 is a diagrammatic plan view illustrating the effect of axial wheel forces on rollers forming a part of the assembly whereby toe-in may be determined.

Proper wheel alignment takes into account a number of interrelated angles between the axles, wheels and their component parts to the end of establishing freedom from tire wear, ease of steering, and safety. Customarily, the angles taken into consideration in aligning a front wheel suspension system include toe-in, caster, camber and kingpin inclination. Toe-in is best illustrated in FIGURE 4 and broadly may be defined as the inward slanting of the wheels toward the front.

Figure 5:
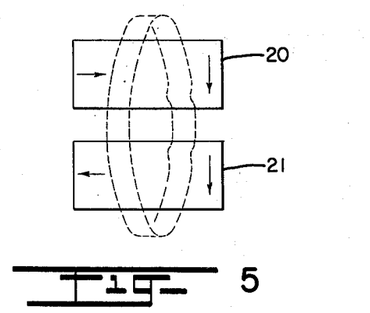
FIGURE 5 is a diagrammatic representation of the effect of axial wheel forces on the rolls from which camber may be determined.

Camber, caster, and kingpin inclination are quite closely related to one another and, in fact, determination of camber in the straight-ahead position and at selected steer angles to the right and left of the straight-ahead position can serve as a basis for the determination of caster and kingpin inclination. Essentially camber, as shown in FIGURE 5, is the inward sloping of the wheels toward the bottom and is desirably employed to bring the point of road contact of the wheel more directly in line with the kingpin axis. In turn, caster is the backward tilt of the front axle relative to the center of the wheel and establishes a trailing effect, as is common in all caster constructions, to overcome hard steering around corners and yet prevent too much wandering of the car. At the proper angle it will tend to cause the wheels to advance without undue scrubbing action on the tires. Actually, the caster angle will greatly affect the camber angle, particularly as the wheels are turned and the caster angle can be shown to be accurately related to a first degree of approximation to the camber angle according to the following equation:

$$\text{Caster (degrees)} = \frac{\text{camber change (degrees)}}{\text{steering angle change (radians)}}$$

Similarly, kingpin inclination, which refers to the angle established between the kingpin and the vertical when viewed from the front of the car, has essentially the same purpose as camber and also assists the caster angle in keeping the wheels steady in the straight-ahead position while tending to straighten the wheels upon completion of a turn, and kingpin inclination can be related to a first degree of approximation to the camber angle according to the following equation:

$$\text{Kingpin angle} = \frac{2 \times \text{camber change (degrees)}}{\text{steering angle}^2 \text{ (radians)}}$$

From the above, in view of the definite relationship which exists between the various angles and since all must be taken into consideration in proper wheel alignment, it is highly desirable to make provision for some effective and reliable means of quickly and accurately checking these various angles and attitudes under conditions closely simulating actual use, for example, while the wheels are in motion and at various steer angles. Additionally, a primary consideration is the ability to make such checks in order to measure the extent of misalignment while eliminating various extraneous factors from consideration or at least to compensate for such extraneous factors. It is equally desirable to enable simultaneous measuring and recording of the interrelated angles at various wheel positions whereby such records can be retained for comparison and reference, and in fact to do so automatically in order to largely eliminate human error.

The above considerations apply as well to testing of a single wheel as to spaced pairs of wheels for example in the conventional vehicle, but with the added factor in the latter event that some compensation must be made for any misalignment between front and rear wheel axles while checking the various angles. Accordingly, it is a principal and foremost object of this invention to enable independent yet correlated checking and measuring of the various interrelated wheel and axle angles contributing to misalignment in a vehicle, and to enable simultaneous checking of the various angles at each desired wheel position, while obtaining most accurate and rapid results, whereby extraneous factors and human errors are eliminated from the final measurements.

It is another object of the present invention to make provision for a method and means capable of accurately and simultaneously measuring the various factors contributing to wheel and axle misalignment, especially automotive wheel systems, and to do so in such a way as to enable close and accurate evaluation of the factors to be considered at various angular wheel positions.

It is another object to provide for a new and useful means for simultaneously checking camber, toe, caster and kingpin angles in a wheel system at various angular wheel positions and in such a way as to minimize and substantially eliminate from consideration various extraneous factors; and, specifically to do so through an apparatus which is self-accommodating to various angular dispositions of the wheel and enables a corresponding indication of the various wheel angles in correlated relation with the primary angles to be measured and recorded.

It is a further object to provide for a wheel alignment checking apparatus conformable for use with either single wheel testing, spaced wheels on a common axle or spaced pairs of wheels in tandem, such as in a conventional motor vehicle or a motorcycle, and where testing can be conducted under conditions simulating actual operation of the wheels and in an accurate and dependable manner.

It is a still further object to provide for a unique wheel-engaging assembly in a checking apparatus for testing wheel and axle alignment and where such assembly is self-aligning with each wheel to be tested and highly sensitive to wheel misalignment in virtually any plane so as to enable accurate and rapid checking of such misalignment; and moreover, to more specifically provide for spaced pairs of wheel-engaging assemblies independently self-aligning and self-accommodating to wheel and axle angles to provide for accurate sensing of caster angles, camber angles, toe-in, and kingpin inclination.

It is an additional object to provide for a method of automatically and simultaneously checking for camber, caster, toe-in and kingpin inclination in a minimum number of steps and at various angular wheel positions so as to enable rapid and accurate reading and evaluation of misaligning factors.

In accordance with the present invention, the above objectives and features are acomplished primarily through the expedient of a wheel testing apparatus incorporating a unique type of wheel-engaging assembly in which flexibly mounted wheel-engaging rolls are capable of pivotal movement about perpendicular axes, and are journaled for rotation on parallel axes in normally coincident, spaced relation for supporting a vehicle wheel thereon; moreover, the rolls are movable relative to one another in an axial direction along their axes in response to axial wheel forces imposed thereon. By sensing the total and differential axial movement of the rolls, under rotation, in response to axial wheel forces and by generating signals corresponding to the movement, these signals are employed to cause pivotal movement of the rolls so as to align their axes with the wheel axis until the rolls are realigned into normal relation. At the same time, means are provided for measuring the new position of the rolls relative to their initial position which measurements can be directly correlated with the axial wheel forces acting upon the rolls and essentially, these wheel forces have been found to be directly related to the camber and toe-in angles of the wheels as best illustrated in FIGURES 4 and 5. Through this construction and arangement, response, signaling, aligning and measuring of the roll movement is registered acurately and simultaneously so as to provide independent, yet correlated, results from the individual readings without interruption of the checking procedure at the various wheel angles. In this connection, the entire method and procedure for checking wheel alignment is believed to be of patentable significance apart from the particular novel means employed in the preferred form of apparatus. In the following, although it will be apparent that the present invention has relation to testing of a single wheel, reference will be made to the alignment of a pair of wheels rotating on a common axle and with particular reference to the front wheel and axle system of a conventional motor vehicle.

The above and other objects, advantages and features will become more readily understood from the following detailed description taken together with the accompanying drawings, in which.

Figure 1:
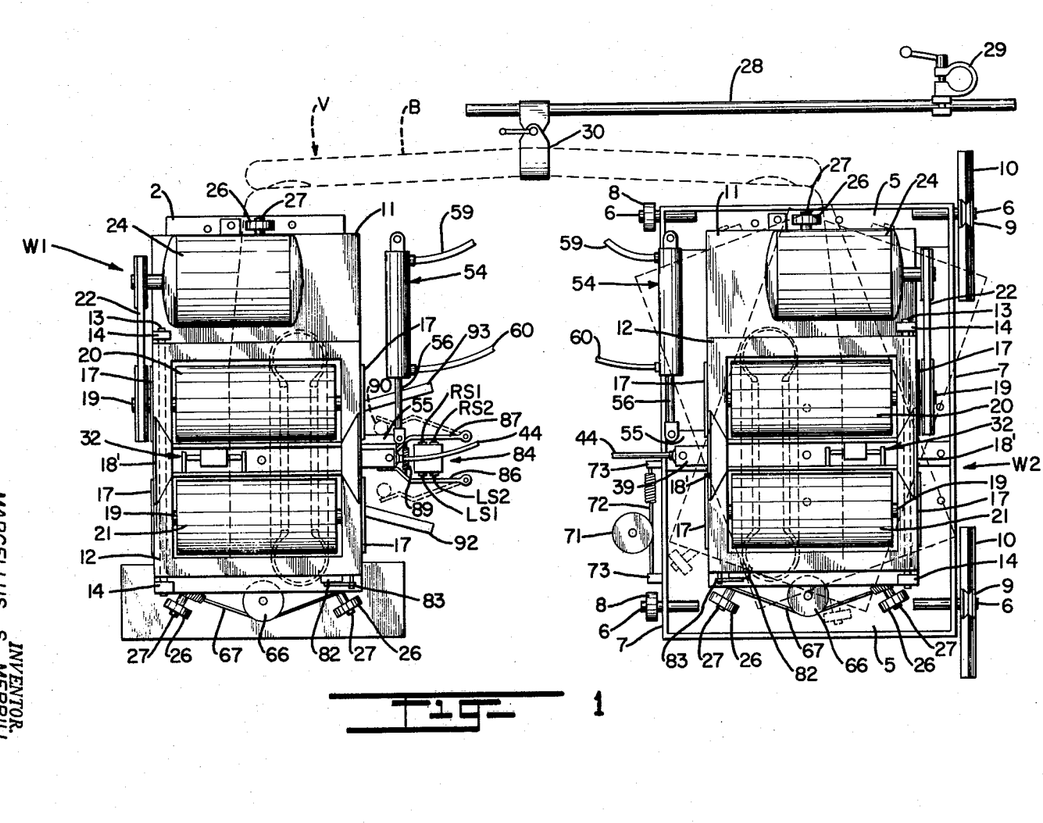
FIGURE 1 is a plan view of a preferred form of wheel engaging and aligning assembly in accordance with the present invention.
Figure 2:
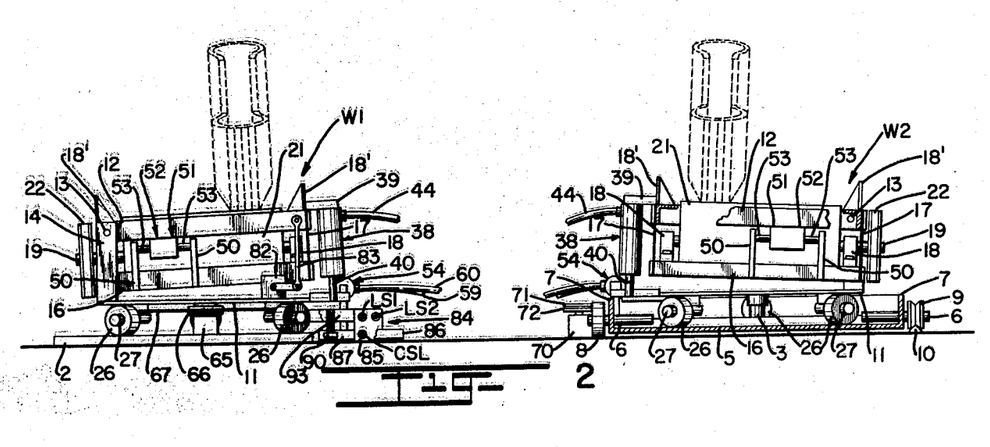
FIGURE 2 is an end view of the assembly shown in FIGURE 1.
Figure 3:
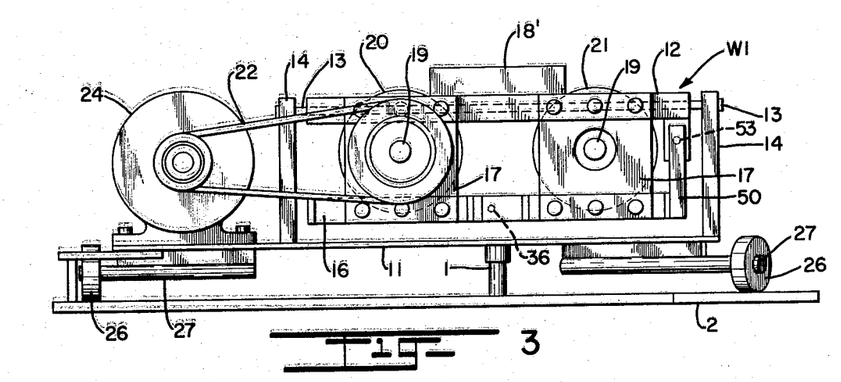
FIGURE 3 is a side view of the left wheel-engaging assembly.

Referring in detail to the drawings, there is shown by way of illustrative example in FIGURES 1–3 left and right wheel-engaging assemblies W1 and W2, respectively, positioned in spaced relation on a level surface and where the spacing between centers of the wheel-engaging assemblies generally corresponds with the axle width of a conventional motor vehicle so that the assemblies are disposed to support either the front or rear wheels of the vehicle. Broadly, each wheel-engaging assembly is comprised of common elements, with the exception that the assembly W1 is pivotally mounted at its center on a shaft 1 projecting upwardly from a stationary floor base 2, whereas the assembly W2 is pivotally mounted at its center on a shaft 3 projecting upwardly from a slidable floor base 5. Here, the floor base 5 is carried by a fore and aft roller assembly including horizontal shafts 6 projecting through side walls 7 of the base; inner rollers 8 are journaled to the shaft 6 on one side of the floor base and outer concave rollers 9 are journaled to the shaft 6 at the other side of the base, the rollers 9 being formed to engage with tracks 10 so as to control the forward and reverse movement of the assembly W2 in relation to assembly W1. In this way, the left side assembly W1 is fixed and for example would locate the left wheel of the vehicle, but the right side assembly, being free to move fore and aft, would align itself with the right wheel and thus avoids the necessity of driving the vehicle onto the assemblies exactly parallel to a fixed line.

Referring in more detail to the common elements of the wheel assembly, each includes a generally rectangular base plate 11 pivotally mounted on the shafts 1 and 3, and in turn an upper tilting frame 12, of open rectangular shape, is pivotally mounted along the top outside edge on a pin 13 extending between bars 14 projecting upwardly from the base plate 11. A pair of front and rear lower tilting frames 16 are suspended by means of flat springs 17 in spaced relation beneath each upper tilting frame for positioning of front and rear spaced pairs of pillow blocks 18, the latter being arranged to receive the opposite ends of shafts 19 for front and rear rollers 20 and 21 respectively. Ample clearance is provided between the roller ends and the ends of the upper tilting frame to permit axial movement of the lower frames and rollers in relation to the upper frame and in this connection, the rollers are mounted within the upper tilting frame in normally coincident, spaced parallel relation to form a central opening or "notch" therebetween to locate the vehicle wheels. Thus, the lower tilting frames 16 permit individual suspension of the rollers 20 and 21 through the leaf springs from the upper common tilting frame, so that the rollers are mounted for differential axial movement relative to one another for a purpose to be described. The front roller 20 of each assembly serves as the drive roll and the rear roller 21 as the follower roll, the front roller being driven through a suitable V-belt drive system 22 connected to motor 24. Conical members 18' on upper frame 12 define end retainers to prevent the vehicle wheels, once properly located, from slipping off the ends of the front and rear rollers under rotation.

In order to firmly support the entire wheel assembly while permitting it to pivot freely about center shafts 1 and 3, each of the wheel assemblies, and specifically the base plates, is free to rotate about the center shafts on rollers 26 which are journaled on horizontal shafts 27 extending radially between the base plates and floor base and being secured to the undersides of the base plates. This arrangement will avoid any undue binding of the assembly about the center shaft and make each wheel assembly sensitive to any slight forces applied thereto. Ahead of the wheel assemblies, a horizontal stabilizing bar 28 is supported by suitable means such as a post 29 and has a vise 30 at its free end for connection to the front bumper B of a vehicle V represented in FIGURE 1. In the above over-all relation as described, it will be evident that a vehicle may be driven onto the assemblies W1 and W2 with its front wheels properly located on the rollers and thereafter the vehicle may be located in place to prevent undue lateral shifting by means of the vise 30. The motor for each wheel assembly drives the associated front roller through a belt as described which in turn spins the associated vehicle wheel. In practice, the assemblies may be mounted in a pit, or if surface mounted, the rear wheels are most desirably supported on a rack in order to have the entire vehicle level while measurements are being made.

It will be seen that the rolls for each of the assemblies W1 and W2 are free to move individually and together in an axial direction in response to axial tire forces on them, and FIGURES 4 and 5 illustrate somewhat diagrammatically how forces are developed from displacement of the tire tread in contact with the rolls when the wheels are out of alignment with the associated rolls. Thus, for instance in FIGURE 4, toe-in forces applied to the rolls will have axial components of force in the same direction causing the rolls of the left wheel assembly, for example, to move a corresponding distance to the left as viewed in the figure. On the other hand, camber forces on the rollers, as in FIGURE 5 representing the right-hand wheel assembly, will have axial components of force of the same magnitude but in opposite directions to cause a differential axial movement of the rolls. However, the assemblies W1 and W2 are capable of adjustment through a servo-mechanism to an attitude realigning the rolls into parallel, centered relation effectively nullifying the axial components of force of the tire or in other words, repositioning the rolls so that their axes are aligned with the wheel axes. Further, movement of the assemblies necessary to bring about realignment can be directly related to axial wheel or tire forces and as seen in FIGURES 4 and 5, the axial wheel forces are directly proportional to the camber and toe angles. As a result, measurement of the movement of the assembly to the new position can be correlated with the wheel forces and in turn the camber and toe angles.

Figure 6:
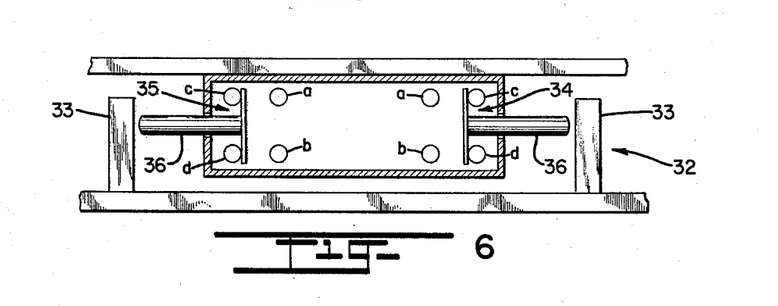
FIGURE 6 is a schematic view of a preferred form of switch assembly to be employed to sense displacement due to toe-in and camber forces.
Figure 7:
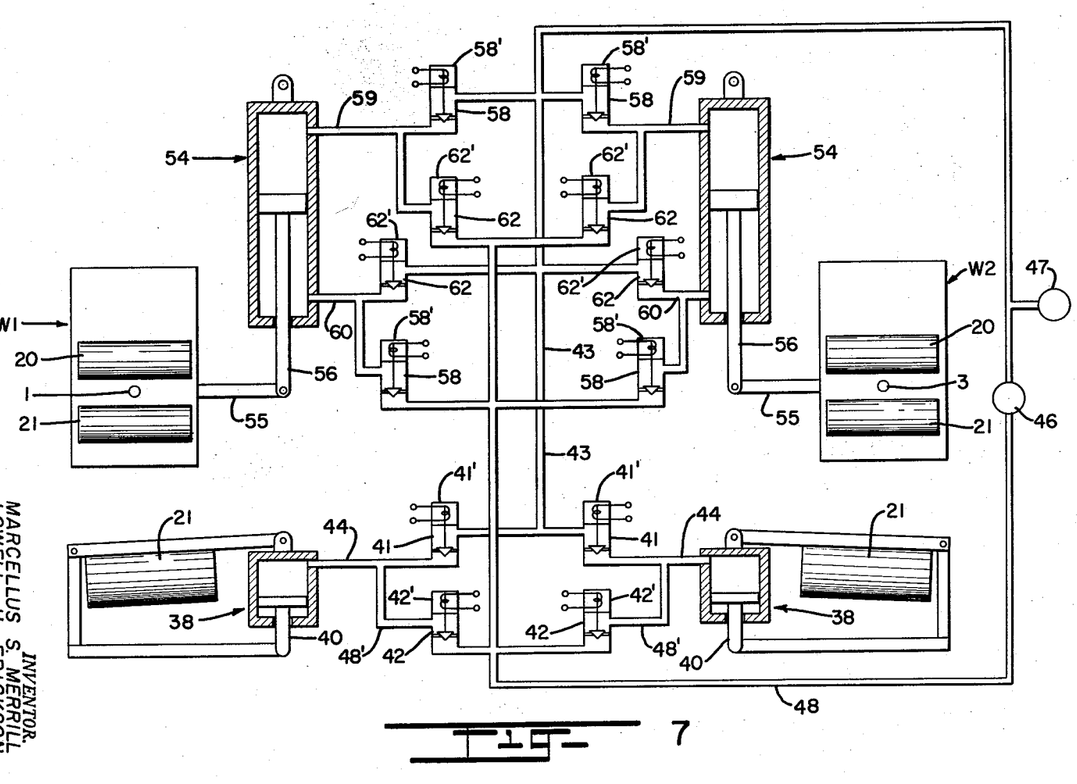
FIGURE 7 is a diagrammatic view of a preferred form of hydraulic control circuit to be used in association with the wheel-engaging assembly.

Reference is made to FIGURES 6 and 7 as well as the figures referred to for a preferred manner of sensing axial movement of rolls 20 and 21, signaling such movement and activating the wheel-engaging assemblies for rotation and vertical tilting to reposition the rolls into proper alignment. Left and right, normally open, camber control switch assemblies 32 are mounted between the rolls of each assembly, each assembly 32 including spaced parallel brackets 33 connected to the lower frame of the rear roll, and a housing connected to the lower frame of the front roll having a near or inner switch 34 and a far or outer switch 35. The switches are provided with spring-biased plungers 36 normally disposed in centered relation between the brackets 33, and the plungers project from opposite ends of the housing into abutting relation with the brackets, this arrangement being shown in detail in FIGURE 6. A camber control cylinder 38 is positioned on each assembly with the end of the cylinder secured to a horizontal arm 39 projecting from the end of the upper frame and a cylinder rod 40 secured to the base plate of each wheel-engaging assembly.

FIGURE 7 represents a preferred hydraulic circuit including the control cylinders 38 for the left and right wheel assemblies whereby in response to actuation of the switches 34 and 35 by plungers 36, each cylinder will serve to control the tilting relationship of the frame and rollers to the wheel axis. This is suitably accomplished by electrically connecting contacts *a* and *b* of switch 34 into the solenoid 41′ of valve 41 in the hydraulic circuit and by connecting contacts *a* and *b* for switch 35 into the solenoid 42′ of the valve 42. Here, it will be noted that the valve 41 is positioned in fluid pressure line 43 so that opening of valve 41 will admit fluid under pressure into the cylinder supply line 44 thereby to increase the tilting angle of the frame and rollers. In other words, in response to axial wheel forces acting on the rollers in the manner shown in FIGURE 5, the plunger 36 will be depressed to close the switch 34 and energize the solenoid of valve 41. Fluid pressure is then admitted through lines 43 and 44 into the cylinder 38 to increase the tilting angle of the rollers until the horizontal plane of rotation of the rollers is aligned with the wheel axis, at which time the plunger will return to centered relation to the brackets. The valve 42 is also normally closed and as the direction of axial wheel forces is reversed under continued tilting, the result would be to open switch 34, depress the plunger to close switch 35 and to energize the solenoid 42′ of the valve 42 thereby to open auxiliary line 43′ and to permit escape of fluid under pressure from the cylinder back through the return line to the pump. Tilting of the frame would be lessened again until the frame and rollers move into alignment with the wheel axis at which time the entire switch assembly will return to centered relation.

Sensing of toe forces is similarly accomplished by mounting a pair of spaced brackets 50 in upwardly extending, spaced relation on the back of the lower rear tilting frame, and suspending a housing having toe switches 51 and 52, of the type shown in FIGURE 6, from the underside of the upper frame assembly, also at the back end, and in normal centered relation to the spaced brackets. Plungers 53 project from opposite ends of the switch assembly, each interposed between separate switch contacts within the assembly and being biased in an outward direction to move into abutting relation with the brackets 50. Toe control cylinders 54 are two-way cylinders and mounted for horizontal extension between the floor base, at the cylinder end, and a control arm 55 to which rod 56 of each cylinder is secured, the control arm in turn being connected to the base plate of each wheel assembly so that the cylinders 54 will control pivotal movement or rotation of the wheel assemblies about the shafts 1 and 3.

Broadly, toe-in axial wheel forces applied to the rolls causing a total axial movement of the rear lower frame to the left, as represented in FIGURE 4, would result in plunger 53 being depressed inwardly to close the inner switch 51 for energization of solenoids for valves 58 in the control circuit of FIGURE 7. One valve 58 is shown positioned in the pressure side of the supply side of line 59 leading to one end of the cylinder and the other valve 58 is positioned in the return side of line 60 leading to the opposite end of the cylinder. Thus, closing of the switch 51 by the plunger 53 would energize both valves 58 simultaneously to admit fluid under pressure to the cylinder end through line 59 while releasing fluid through the return line 48. Conversely, over-all movement of the tilting frame and rolls to the right, closing switch 52, would energize the solenoids of valves 62, one valve 62 being positioned in the return side of the line 59 and the other valve 62 being positioned in the pressure side of line 60 where, upon opening the valves, pressure would be supplied through line 60 and released through line 59 to move the cylinder rod 56 inwardly causing pivoting in the opposite direction. As a typical example of the operation of the toe control assembly, assuming toe-in to the right for example as viewed in the left wheel assembly illustration, axial wheel forces would be directed to the left thereby closing switch 51 and energizing valves 58 causing rearward movement of the rod to force the assembly to pivot in a clockwise direction until moving into proper alignment with the wheel axis in a vertical plane. Similarly, axial wheel forces introduced by camber causing a differential axial movement of the rolls and depression of the switch 34 would result in energization of valve 41 and raising of the frame until the entire frame and roll unit is realigned with the wheel axis. In describing the control circuit operation it will be noted that each wheel assembly is separately controlled according to individual wheel forces although corresponding parts for each assembly have been similarly designated.

Figure 9:
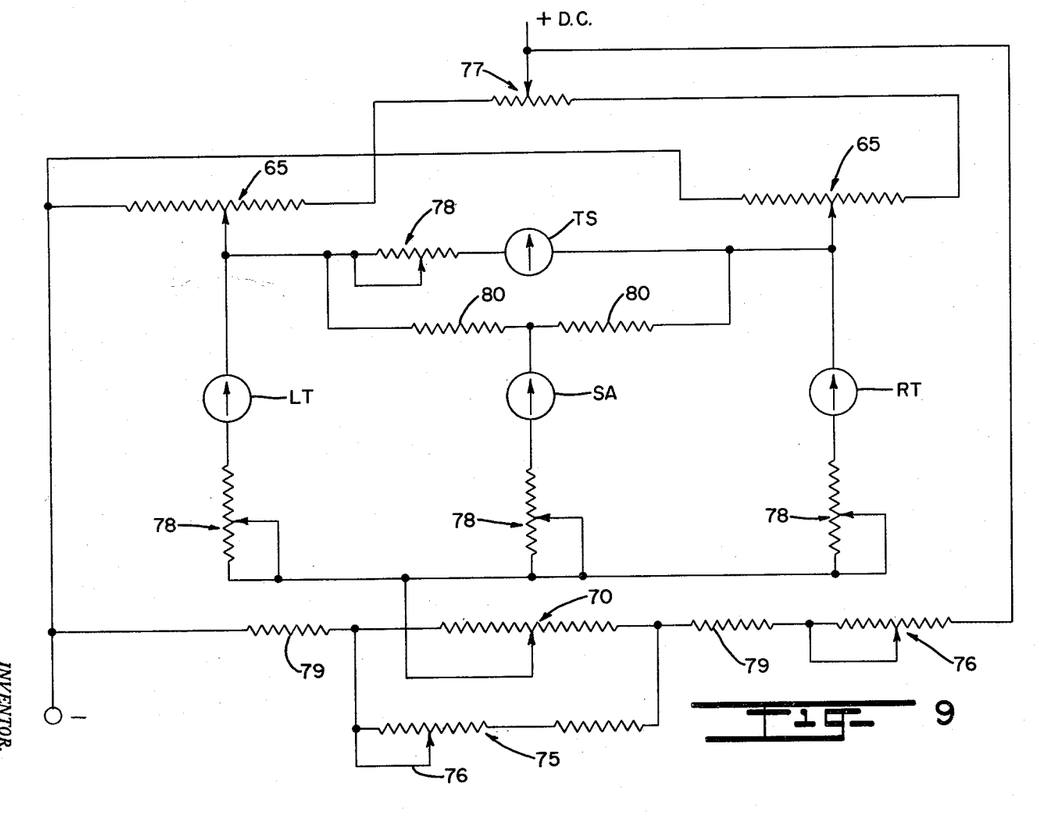
FIGURE 9 is a circuit diagram of a preferred form of measuring circuit for measuring and recording the toe-in angle.

In order to measure the various angles, in accordance with the preferred form of invention, the toe angles of the wheels are most desirably considered apart from the other angles and are taken when the wheels are in the straight-ahead position. To obtain the toe angle measurement, again this is basically determined by the realignment of the rolls under the influence of the control cylinder 54; and, to measure the angle of change of the rolls, electrical potentiometer transducers are preferably employed to introduce a voltage change into the toe measuring circuit of FIGURE 9 corresponding to the pivotal movement of the entire wheel-engaging assembly about its vertical axis. Each transducer 65 for the left and right assemblies W1 and W2 is mounted on the floor base just back of the rearward edge of each base plate and is coupled to the base plates through a pulley 66 mounted on the potentiometer shaft and a wire element 67, each wire being secured at its free ends to opposite rear edges of the base plate. In this way, angular movement of the base plates in relation to the stationary floor base will cause rotation of the pulley and of the potentiometer shaft to introduce a corresponding direct current voltage difference into the toe measuring circuit. As further shown by the figures, a transducer 70 is positioned on the floor base of the right wheel-engaging assembly again with a pulley 71 mounted on the top of the potentiometer shaft and with a wire element 72 wound about the pulley and secured at its ends to brackets 73 on the base plate. Transducer 70 will introduce a resistance and resulting voltage change into the toe circuit to compensate for the "drive on" angle of the vehicle with respect to the wheel-engaging assemblies. As seen from the circuit, a stretcher series resistance 75 including a slider arm 76 is connected in parallel across the compensator to match the voltage across transducers 65. Variable resistor 76 provides an added means of adjustment to insure that the voltage across the transducers 65 is the same as that across the transducer 70, and variable resistance 77 is a "toe sum zero" adjustment to establish matching resistance across the transducers 65.

Figure 11:
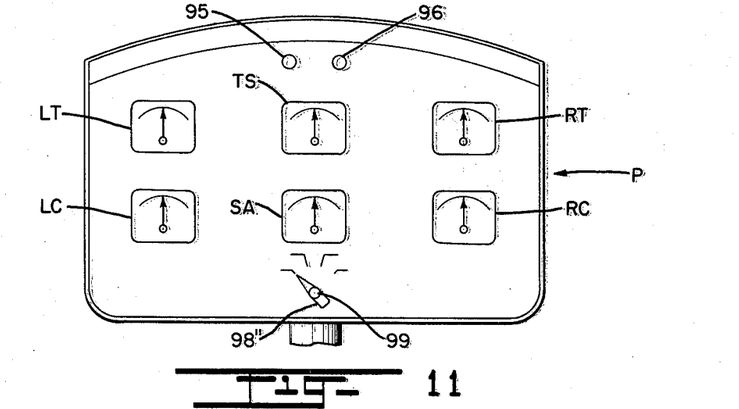
FIGURE 11 is a view of a panel including a series of meters for recording and indicating the measurements taken at various wheel angles.

By reference to FIGURE 11 of the recording panel for the various angles considered in conjunction with the toe measuring circuit, the operator can adjust the steering wheel mechanism to align the wheels in the straight-ahead position. When the rolls and wheels are rotated, the left toe meter LT will register the voltage change in the left toe tranducer 65, and right toe meter RT will similarly measure the voltage change in the right toe transducer 65, each indicative of the actual toe-in angles of the left and right wheels respectively. The toe sum meter TS at the center of the panel will record the difference in readings, and steer angle meter SA will register the mean of the LT and RT meter readings. Variable resistances 78 in the circuit serve as scale factors for the various meters in a well-known manner. Resistances 79 and 80 are, respectively, matched resistances to control the impedance level in the circuit. As will become apparent, the toe angle readings, although measured apart from any consideration of the other angles, are registered simultaneously with the other readings by means of the separate toe circuit.

In order to measure the camber angles in the straight-ahead position, as well as angular positions to the left or right of the straight-ahead position, a separate means of measurement is employed preferably through a circuit completely independent of the toe circuit; and, in a manner to be described, the caster and kingpin inclination, and the spindle angle, bear a direct relationship to the camber angle and can be read directly by applying a factor to the camber angle readings in the various positions. Reference is made to the control and camber circuits shown in FIGURES 8 and 10 in conjunction with the assembly illustrated in FIGURES 1 and 2 where again electrical potentiometer transducers are preferably employed as a means of measuring the angular change of the tilting frames as they move into aligned relation with the wheel axles. Specifically, a transducer 82 is positioned on the base plate of each wheel assembly W1 and W2 and is coupled thereto through connecting links 83. The zero position for the purpose of measurement may be taken with the tilting frames in a level position whereupon any angular movement of the tilting frame about the horizontal axis will cause movement of the linkage 83 in relation to the transducer which, through the potentiometer shaft, will develop a voltage change according to the distance of movement. Preferably the transducer 82 will measure this tilting movement in the straight-ahead position, and at angular positions to the left and right of center, since the caster and kingpin angle readings can be derived from comparative readings at different angular positions in a manner to be described.

Figure 8:
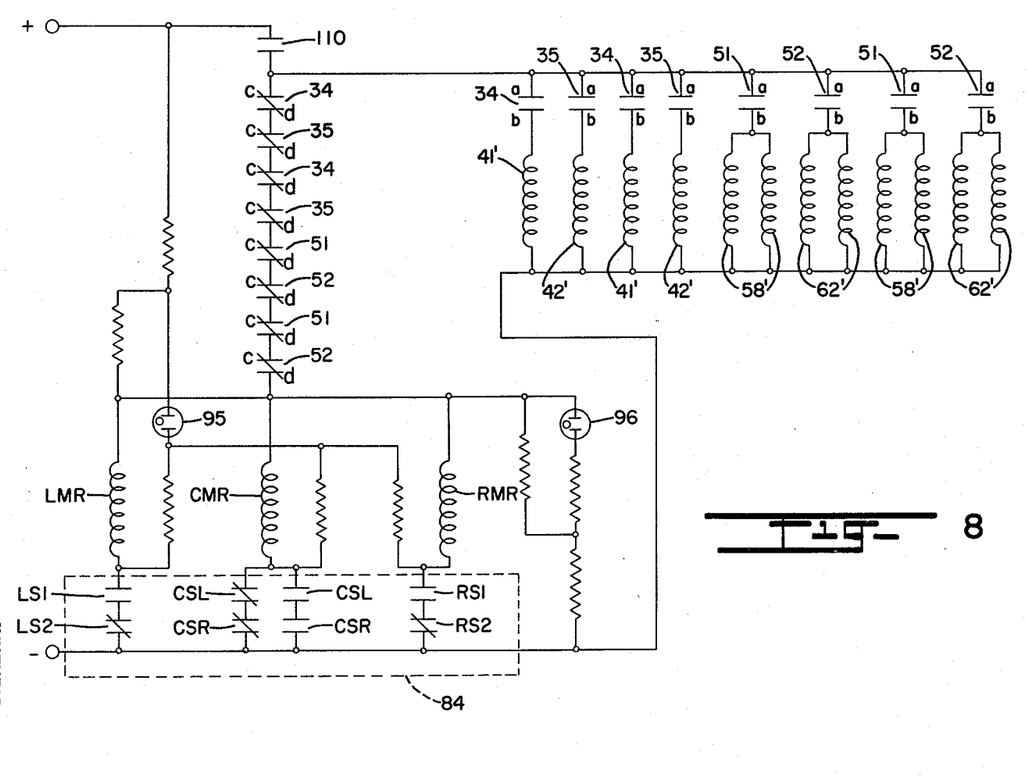
FIGURE 8 is a circuit diagram of a preferred form of main electrical control circuit.
Figure 10:
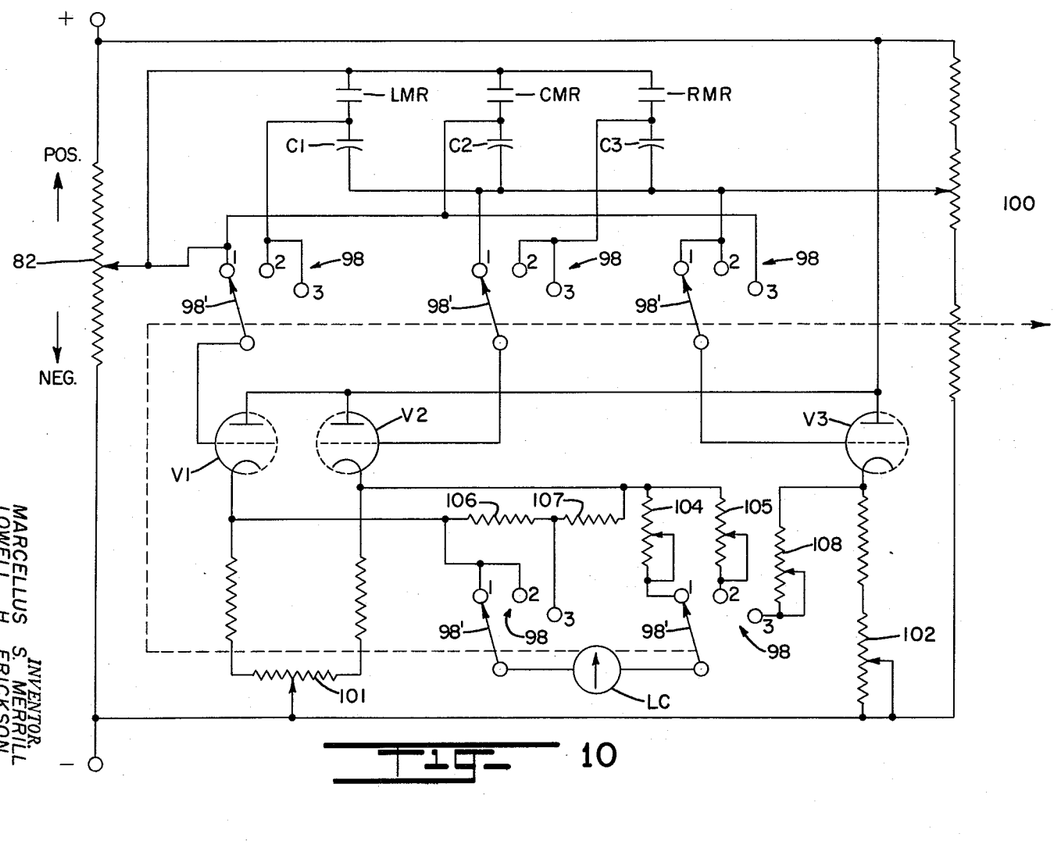
FIGURE 10 is a circuit diagram of a preferred circuit for measuring camber, caster, and kingpin inclination.

In order to measure the tilting movement of the rolls at the various steer positions of the wheels and to properly correlate these readings for the purpose of determining caster and kingpin inclination, the main control and camber circuits of FIGURES 8 and 10, respectively, are designed broadly to selectively register each camber measurement only when the wheels are properly set at the desired straight-ahead or angular position and to store the readings for comparison. Specifically, caster can be determined by selecting a sweep angle between the two limits of the angular positions, then taking the difference in camber end readings at the two positions and multiplying by a factor according to the equation expressed earlier. Kingpin inclination can be determined by multiplying a constant factor by the difference between the mean of the two camber end readings and the center or "straight-ahead" reading, again according to the expression in the equation for kingpin inclination. To accomplish the above, capacitors C1, C2 and C3 are arranged in parallel in the camber circuit each having associated therewith a memory storage control relay, designated in order as LMR, CMR and RMR for the respective capacitors; relay coils for each of the memory storage relays are correspondingly designated in the main control circuit shown in FIGURE 8.

In order for each relay coil to be energized, closing its respective relay as well as the camber circuit into the corresponding capacitor for storage of the camber reading, two conditions must be met: first, all of the camber and toe control switches must be in the normally closed position, indicating that the rolls have been properly realigned and centered with respect to the disposition of the wheel; and secondly, the rolls must be at the proper angular or straight-ahead setting before the measurement is stored in each capacitor. To this end, the normally closed switch contacts $c$ and $d$ for the toe and camber control switches are electrically connected into the common line leading from the voltage source to the relay coil, as best seen in FIGURE 8. To sense the angular or straight-ahead setting of the wheels and associated rolls, a switch assembly 84 is mounted in stationary relation adjacent the floor base for the left wheel-engaging assembly W1, this switch assembly also being represented diagrammatically at 84 in FIGURE 8. Actually, the switch assembly may be disposed in various positions and controlled in any well-known way to the end of properly sensing the disposition of the rolls, or steer angle, and for example might as easily be positioned on the right wheel-engaging assembly. In the preferred form, however, the switch assembly includes two pair of double-pole relay control switches LS1, LS2 and RS1, RS2 mounted on opposite sides of the switch assembly, functioning as left and right memory relay control switches, respectively, together with lower switches CSL and CSR, functioning as the center memory relay control switches. The center memory relay control switches are normally closed when the wheels are lined up in the straight-ahead position, so that the reading will be stored in the capacitor C2 as soon as the toe and camber control switches are properly centered in the realigned position so as to close the main line to the relay coil CMR. The center relay control switches are held in normally closed relation by a pair of control arms 86 and 87 which are pivotally mounted on opposite sides of the switch assembly and extend inwardly toward the wheel-engaging assembly where, at their free ends, they are joined together and biased inwardly holding the switches CSL and CSR in normally closed relation by means of a common spring 89. To de-energize either of the central control switches, a roller 90 is suspended from the base plate between the free ends of the arms 86 and 87 so that upon counter-clockwise movement of the wheel assembly about the vertical axis, the roll 90 will move forwardly urging the front arm 87 away from the switch CSL so that the switch will open slightly left of center to de-energize the relay coil for relay CMR; or, under clockwise pivotal movement of the assembly to the right, the roller 90 will urge the arm 86 toward the dotted line position, as indicated, and away from the switch CSR to de-energize the relay coil CMR. Accordingly, movement of either arm in the manner described in response to movement of the wheel assemblies, either slightly left or slightly right of center, will open either of the normally closed switches so as to de-energize the coil for the memory storage control relay in the camber circuit.

The angular position at which camber measurements are taken either to the left or right of center are determined by the use of reading position switch operating arms 92 and 93 which are attached to the underside of the base plate for horizontal extension at a predetermined angle both fore and aft in spaced relation to the upper switches LS and RS. Assuming that the operator turns the wheels, for example, 15 degrees to the left, the arm in its angular relationship to the switch assembly will pivot forwardly and first depress the plunger for the switch LS1 at which point the position indicating light 95 in the control circuit will flash to indicate that the desired angular position has been reached. Continued turning of the assembly along with the arm will result in depression of the plunger for LS2 thus opening the circuit and de-energizing the light so the operator will know when he has reached the desired angle as indicated by the light or when he has gone beyond the desired angle at which time the light will go off. The same applies in rotating the wheel to the right and again the angle will be determined by the angular relation of the arm 93 to the switches RS1 and RS2. In this manner, when the wheels are turned left to the desired angle, the circuit will be closed into relay LMR; in the straight-ahead position to relay CMR; and when turned to the right to relay RMR. The operator will hold the steering wheel in the selected position making sure indicator light 95 remains on, along with the indicator light 96, the latter reflecting that the rolls have been properly aligned with the wheel axes as a result of centering the toe and camber control switches.

At each position, one of the relays will close to store the camber transducer voltages in a corresponding capacitor. As both lights are energized, the operator may turn immediately to the next position until both lights flash, and then repeat the procedure a third time for the last position. At the end of this cycle, all of the information is stored in each memory capacitor necessary for determining camber, caster and kingpin inclination.

The camber circuit as illustrated in FIGURE 10 actually is representative only of the measuring circuit portion for the left wheel, and the multi-position switch 98 is ganged to similar switch sections on the opposite side of an identical circuit, not shown, for the right wheel. To establish a zero or referenec setting for the circuit, the rolls in each wheel assembly W1 and W2 are leveled, then variable resistances 100, 101 and 102 are adjusted through their associated slider arms to set the meter readings for caster, camber and kingpin inclination, respectively, at zero. A vacuum tube comprised of a series of grid and cathode follower circuits, represented by V1, V2 and V3, is employed to prevent the charges from leaking off the capacitors, once stored. Also, the switch 98 is comprised of a series of switch contacts and a corresponding series of pointers 98′ all keyed to a common shaft 99 projecting from the recording panel P; another indicator arm 98″ is keyed to the shaft and against the panel to advance the switch arms to the various positions.

Each of the respective readings for camber, caster and kingpin inclination will appear on meters LC, indicating the left wheel position, and RC, indicating the right wheel position. By turning switch 98 to position 1, for example, camber is obtained by connecting the grid V1 to the capacitor C2 and the grid V2 to the opposite side of the capacitor. Resistance 104 is adjusted to give the camber directly in degrees or other convenient units. Caster is obtained in position 2 connecting the grid V1 to capacitor C1 and the grid V2 to capacitor C3 so as to relate the difference in end readings multiplied by a factor, here defined by the resistance value of the variable resistance 105 and is adjusted to give a reading in the same units as camber. Kingpin inclination is obtained in position 3, this being proportional to the difference between the voltages at the junction of C2 and relay CMR and the mean of the voltages at the junction of C1–LMR and C3–RMR, the voltage at C1 being connected to the grid V1 and the voltage of capacitor C3 being connected to the grid V2; the voltage of capacitor C2 is connected to the grid V3. The meters are adjusted to read kingpin inclination by applying a constant factor, directly in degrees or other convenient units, through selection of proper values for the resistances 106, 107 and 108.

From the foregoing, it will be apparent that all sensing, realigning and measuring is carried out automatically, it being necessary for the operator to insure only that the vehicle wheels are properly positioned and supported on the wheel-engaging assemblies, start the motors and turn the wheels to the various positions for readings. Thus, in testing a front wheel suspension system for an automobile, the vehicle is driven onto the assembly, and stabilizer bar 28 is clamped to the front bumper B. The drive motors 24 are started and a starter button, not shown, may be depressed to close the motor starting relay 110 shown in FIGURE 8. At this stage, the checking operation can be initiated, keeping in mind that the meters on the according panel were to have been preset, or adjusted to the desired zero or reference setting, before the vehicle was driven into position.

In that caster and kingpin inclination are based on the total sweep angle between the angular steer positions, the switch operating arms 92 and 93 should also be carefully adjusted to control closing of the memory storage relays LMR and RMR; and, for example, the factor for determining these angles from the camber readings, upon which the settings for resistances 104, 106, 107 and 108 are derived, may be based on an angle of 30 degrees and the end readings will be taken at 15 degrees to the left and right of center. In this relation, the individual angles are of little significance, it being the total sweep angle which must remain constant. Accordingly, the operator may first turn the wheels to the left until the first position indicator light 95 comes on and hold until the balance indicator light 96 is on indicating realignment of the rolls into parallel relation with the wheel axes. Of importance to note here is that the voltage change in the various transducers will be recorded and stored in the capacitor C1 coincident with the lights coming on, in that the operator can turn immediately to the next straight-ahead position for recording, again as reflected by the lights 95 and 96. In this position, the toe-in angle reading should be noted on meters LT, RT and TS. Here the toe-in angle circuit will operate continuously throughout the entire checking procedure and readings may be noted in every position if desired.

The wheels are then turned to the right to record and store the last readings, again as indicated by the lights 95 and 96, whereupon the checking operation is completed. Thereafter, the operator may turn the switch arm 98″ to the various positions to obtain the desired readings for camber, caster and kingpin inclination. Thus, in a matter of seconds the various angles involved in determining wheel alignment are accurately checked and recorded for evaluation. In this relation, the spindle angle may be determined simply by adding another switch contact in parallel to the camber contact 1 in FIGURE 10, since it would be directly related to the camber angle at the various positions; this position is not shown since it would be the same as the camber angle reading.

It will be evident that the construction and arrangement of the present invention is conformable for single wheel testing and tandem wheel testing, such as, a motorcycle. In the latter event, a single or pair of wheel-engaging members would be employed in testing each wheel. Rear wheel testing for cycles or motor vehicles may also be conducted in the preferred form of assembly, at least for checking camber and toe angles, with little modification.

Various modifications and changes in the apparatus and method of this invention will become apparent, and for example the manner of pivoting and location of pivot points for the assemblies W1 and W2 may be varied, as well as the particular form of servo-mechanism employed to realign the wheel engaging members. Other variations and changes will become apparent from a consideration of the foregoing without departing from the scope of and spirit of this application as defined by the appended claims.

What is claimed is:

1. In a wheel alignment apparatus, at least one wheel-engaging member mounted for pivotal movement about perpendicular axes, means for pivotally moving said member about said axes, said member being journaled for rotation on a generally horizontal axis for contacting a rotatable wheel thereon, said perpendicular axes being perpendicular to said generally horizontal axis, means for rotating said wheel and wheel-engaging member, and said member being responsive to wheel contact forces imposed thereon under rotation to undergo a change in attitude until its axis is aligned with the wheel axis.

2. In a wheel alignment apparatus, a pair of wheel-engaging members mounted for pivotal movement about perpendicular axes, said members being journaled for rotation on spaced parallel axes for supporting a rotatable wheel thereon, means for rotating said wheel and wheel-engaging members, and said members being movable together and independently of one another in response to wheel contact forces imposed thereon under rotation.

3. In a wheel alignment checking apparatus, at least one pair of wheel-engaging rolls mounted for pivotal movement about perpendicular axes, said pair of rolls being mounted for rotation on parallel axes in normally coextensive, spaced relation for supporting a rotatable wheel thereon, means for rotating said wheel and rolls of each pair, the rolls of each pair being responsive to axial wheel forces imposed thereon under rotation, and means secured to said rolls to sense axial wheel forces, imposed thereon.

4. In a wheel alignment checking apparatus according to claim 3, said pair of rolls being further characterized by being mounted for said pivotal movement about a horizontal axis at the one end of said rolls and a vertical axis centrally located between said rolls.

5. In a wheel alignment checking apparatus according to claim 4, aligning means responsive to said sensing means to cause vertical and horizontal pivotal movement of said rolls into alignment with the plane of rotation of the wheel.

6. In a wheel alignment checking apparatus, a spaced pair of spring-mounted, wheel-engaging units, each unit including a frame mounted for pivotal movement about a horizontal axis at one end of said frame and a vertical axis located centrally of said frame, each unit further including a pair of members journaled for rotation on spaced parallel shafts to support a pair of spaced, axle-mounted vehicle wheels thereon, drive means for rotating at least one of the members of each unit, and the members of each unit being movable together and independently of one another in an axial direction in response to axial wheel forces imposed thereon under rotation.

7. In a wheel alignment checking apparatus according to claim 6, one of said units being movable in a fore and aft direction with respect to the other unit.

8. In a wheel alignment checking apparatus according to claim 6, each shaft including a spring at opposite ends thereof suspending said shaft from said frame for free axial movement in response to axial wheel forces imposed thereon.

9. In a wheel alignment checking apparatus according to claim 6, sensing means associated with each pair of members to sense individual and differential axial movement of said rolls and to generate signals corresponding to such movement, and measuring means associated with said members to determine their new position in response to axial wheel forces.

10. In a wheel alignment checking apparatus according to claim 9, being further characterized by aligning means on each frame being responsive to the signals generated to cause vertical and horizontal pivotal movement of said frame and associated members thereby to realign said members with the plane of rotation of each wheel, said measuring means being adapted to measure the new position of each frame and members with respect to each wheel.

11. In a wheel alignment checking apparatus, a pair of horizontally extending wheel-engaging rolls mounted for pivotal movement about horizontal and vertical axes and being journaled for rotation on parallel axes for supporting a rotatable wheel thereon, drive means for rotating at least one of said rolls, said rolls being disposed for independent axial movement in response to axial wheel forces imposed thereon under rotation, and signal means associated with said rolls to sense individual and differential axial forces of said rolls under rotation and to generate signals corresponding to such movement.

12. In a wheel alignment checking apparatus according to claim 11, aligning means responsive to the signals generated to cause vertical and horizontal pivotal movement of said rolls in order to align said roll axes with the axis of the wheel and to realign said rolls with the wheel axis.

13. In a wheel alignment checking apparatus according to claim 12, measuring means associated with said rolls to determine the new position of said rolls with respect to said wheel.

14. In a wheel alignment checking apparatus, at least one pair of spring mounted wheel-engaging rolls including a frame mounted for pivotal movement about horizontal and vertical axes, said rolls being journaled for rotation on parallel shafts in substantially horizontal spaced relation for supporting a rotatable wheel thereon, drive means for rotating at least one of said rolls, said rolls being movable together and independently of one another in an axial direction in response to axial wheel forces imposed thereon under rotation, signal means on said frame and between said rolls to sense total and differential axial movement, respectively, of said rolls under rotation and to generate signals corresponding to such movements, and aligning means on said frame responsive to the signals generated to cause vertical and horizontal pivotal movement, respectively, of said rolls in order to realign said roll axes with the axis of the wheel.

15. In a wheel alignment checking apparatus according to claim 14, measuring means secured to said frame adapted to measure vertical and horizontal movement of said frame in realigning said rolls and to develop signals corresponding to the movement for recording.

19. In a wheel alignment checking apparatus according to claim 15, said measuring means being defined by a first potentiometer including a horizontally extending link connected to said frame for rotation in response to vertical pivotal movement of said frame, and a second potentiometer including a vertical connecting link connected to said frame for rotation in response to horizontal pivotal movement of said frame, said first and second potentiometers generating electrical signals corresponding with the rotation of their respective shafts, and an electrical circuit receiving the signals developed for recording.

17. In a wheel alignment checking apparatus according to claim 16, said circuit including memory circuit means for storing the signals received from said potentiometers.

18. In a wheel alignment checking apparatus, a spaced pair of wheel-engaging roll units, each unit including a frame mounted for tilting and rotational movement and a pair of rolls journaled for rotation on parallel shafts on said frame in horizontal spaced relation, said units being disposed in juxtaposed relation for supporting a spaced pair of axle-mounted vehicle wheels thereon, drive means for rotating at least one of the rolls of each unit, said rolls being movable together and independently of one another in an axial direction along their axes in response to axial wheel forces imposed thereon under rotation, one of said units being movable in a fore and aft direction to enable alignment of said units with the wheel axis with means to sense the change in disposition of said one unit, signal means on said frame and between said rolls to sense total and differential axial movement respectively of said rolls under rotation and to generate signals corresponding to such movement, and aligning means responsive to the signals generated to cause tilting and rotational movement of said rolls in order to align said roll axes with the axes of the wheels.

19. In a wheel alignment checking apparatus according to claim 18, an electrical circuit including means secured to each frame for measuring the vertical and horizontal angular movement of said frame in realigning said rolls and to develop signals corresponding to the movement for recording at a series of steer angles, and with means in said circuit to correlate each measurement with the respective steer angle.

20. A wheel alignment checking apparatus for determining camber angles of a pair of spaced vehicle wheels comprising a pair of spaced apart wheel-engaging roll units, said units including rotatable members for supporting a pair of correspondingly spaced axle-mounted vehicle wheels thereon and a frame for each unit supporting said rotatable members for tilting movement from a first predetermined position to a second position in alignment with each of the wheel axes, electrical control circuit means for each unit, each including signal means to sense tilting misalignment between said rotatable members and the plane of rotation of the wheel and drive means energized in response to said signal means to cause tilting movement of said frame until said rotatable member is aligned in a horizontal plane parallel with the wheel axis, a measuring circuit for each unit including means to measure the tilting movement of said frame from the first to the second position and to develop separate electrical signals corresponding to the extent of tilting movement with means to separately store each signal for recording therefrom, steer angle sensing means interconnected between said frame and said measuring circuit to relate the steer angle position of the wheels, and means in said measuring circuit to correlate the steer angle sensing means interconnected between said frame and said measuring circuit to relate the steer angle of the wheels with each signal received corresponding to the tilting movement of said frame.

21. A wheel alignment checking apparatus according to claim 20, said measuring circuit having a capacitor for storing a signal at each steer angle position, a meter for each wheel, a plurality of variable resistances interposed in parallel between said capacitors and said meter in each circuit, and a multi-position switch for selectively interconnecting said meter and capacitors through a selected resistance thereby to determine caster angle and kingpin inclination from said camber angle measurement at the different wheel positions.

22. A wheel alignment checking apparatus for determining toe-in and camber angles of a pair of spaced vehicle wheels comprising a pair of spaced apart wheel-engaging roll units, said units including rotatable members for supporting a pair of correspondingly spaced axle-mounted vehicle wheels thereon and a frame for each unit supporting said rotatable members for rotational and tilting movement from a first predetermined position to a second position in alignment with each of the wheel axes, electrical control circuit means for each unit, each circuit means including signal means to sense misalignment between said rotatable members and the wheel with means energized in response to said signal means to cause rotation and tilting movement of said frame until said rotatable members are aligned with the wheel axis, a first toe-in angle measuring circuit for each unit including means to measure the rotational movement of each frame at the second position, and a second camber angle measuring circuit for measuring the tilting movement of said frame at the second position and to develop separate electrical signals corresponding to the tilting movement, with means to separately store each signal corresponding to tilting for recording therefrom, steer angle sensing means interconnected between said frame and said second measuring circuit to relate the steer angle position of the wheels, and means in said second measuring circuit to correlate the steer angle of the wheels with each signal received corresponding to the tilting movement of said frame.

23. A method for checking camber angles of a pair of spaced vehicle wheels, comprising the steps of positioning each wheel on a rotatable surface pivotal about a horizontal axle, rotating each respective wheel and its respective surface together, positioning the wheels and surfaces in straight-ahead relation and in predetermined angular relation to the left and right of the straight-ahead position, sensing the differential axial components of force applied to each respective rotatable surface by each respective wheel in each position, and measuring the differential axial components of force applied in each position.

24. A method for checking alignment of a pair of spaced vehicle wheels, comprising the steps of positioning each wheel between a pair of rotatable surfaces freely pivotal about common vertical and horizontal axes, rotating each wheel and the surfaces together, positioning the wheels and surfaces in straight-ahead relation and in predetermined angular relation to the left and right of the straight-ahead position, sensing the differential and total axial components of force applied to the rotatable surfaces by each wheel in each position, measuring the total axial component of force of each wheel to determine its toe by moving a first one of said rotatable surfaces for each wheel until the total axial components of force existing between each said first rotatable surface and its respective wheel are zero for the straight-ahead position and measuring the horizontal angular movement of said first rotatable surface with respect to a reference plane for said position angle, and independently measuring the differential axial components for force applied in each position by moving the second one of said rotatable surfaces for each wheel until the differential axial components of force existing between each second one of said surfaces and its respective wheel are zero for each of said positions and measuring the vertical angular movement of each second one of said surfaces for each wheel with respect to a reference plane for each position and storing each of said measurements, followed by comparing the stored measurements in the latter positions and determining camber, caster and kingpin inclination therefrom.

25. In a wheel alignment apparatus, a pair of wheel-engaging members mounted for pivotal movement about perpendicular axes, means for pivotally moving said members about said axes, said members being journaled for rotation on spaced parallel axes for supporting a rotatable wheel thereon, means for rotating said wheel and wheel-engaging members, one of said perpendicular axes being perpendicular to a plane in which lies the longitudinal axes of said members, and said members being movable relative to each other in response to wheel contact forces imposed thereon under rotation.

References Cited by the Examiner

UNITED STATES PATENTS

| | | | |
|---|---|---|---|
| Re. 18,138 | 7/31 | Prather | 33—203.13 |
| 2,137,949 | 11/38 | Phelps | 33—203.13 |
| 2,598,599 | 5/52 | Pleasance | 33—203.13 |

FOREIGN PATENTS 1,235,123   5/60   France.

ISAAC LISANN, *Primary Examiner.*